United States Patent
Jung

(10) Patent No.: US 7,592,034 B2
(45) Date of Patent: *Sep. 22, 2009

(54) DISPENSER SYSTEM FOR LIQUID CRYSTAL DISPLAY PANEL, DISPENSING METHOD USING THE SAME, AND METHOD OF FABRICATING LIQUID CRYSTAL DISPLAY PANEL USING DISPENSER SYSTEM AND DISPENSING METHOD

(75) Inventor: Sung-Su Jung, Daegu (KR)

(73) Assignee: LG Display Co., Ltd., Seoul (KR)

( * ) Notice: Subject to any disclaimer, the term of this patent is extended or adjusted under 35 U.S.C. 154(b) by 663 days.

This patent is subject to a terminal disclaimer.

(21) Appl. No.: 10/691,662

(22) Filed: Oct. 24, 2003

(65) Prior Publication Data
US 2004/0090591 A1    May 13, 2004

(30) Foreign Application Priority Data
Nov. 13, 2002    (KR) ................ 10-2002-0070489

(51) Int. Cl.
*B05D 5/06* (2006.01)
(52) U.S. Cl. .................. 427/58; 118/316; 438/30; 427/421.1; 427/424
(58) Field of Classification Search ........... 427/424, 427/427.1, 58; 118/316, 315; 438/30
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 4,869,935 A * | 9/1989 | Hayashi et al. ............ 427/8 |
| 5,247,377 A | 9/1993 | Omeis et al. |
| 5,263,888 A | 11/1993 | Ishihara et al. |
| 5,292,368 A * | 3/1994 | Komine et al. ........... 148/315 |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |

(Continued)

FOREIGN PATENT DOCUMENTS

EP    1 003 066    5/2000

(Continued)

*Primary Examiner*—Timothy H Meeks
*Assistant Examiner*—Jimmy Lin
(74) *Attorney, Agent, or Firm*—McKenna Long & Aldridge LLP

(57) ABSTRACT

A dispenser system for a liquid crystal display panel includes at least one table upon which a substrate having a plurality of image display parts is loaded, a plurality of syringes each having a nozzle at one end portion for supplying a dispensing material onto the substrate, and a plurality of robot arms having the plurality of syringes arranged at both sides of the table.

1 Claim, 19 Drawing Sheets

U.S. PATENT DOCUMENTS

| | | | |
|---|---|---|---|
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,252,643 B1 * | 6/2001 | Song | 349/139 |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 2001/0013920 A1 * | 8/2001 | Hashimoto et al. | 349/187 |
| 2001/0021000 A1 | 9/2001 | Egami | |
| 2003/0083203 A1 * | 5/2003 | Hashimoto et al. | 505/100 |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | H06-018829 | 1/1994 |
| JP | 6-51256 | 2/1994 |
| JP | 6-148657 | 5/1994 |
| JP | 6-160871 | 6/1994 |
| JP | H06-194637 | 7/1994 |
| JP | 6-235925 | 8/1994 |
| JP | 6-265915 | 9/1994 |
| JP | H06-064229 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 8-101395 | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 8-190099 | 7/1996 |
| JP | H08-173874 | 7/1996 |
| JP | 8-240807 | 9/1996 |
| JP | 9-5762 | 1/1997 |
| JP | 9-26578 | 1/1997 |
| JP | H09-001026 | 1/1997 |
| JP | 9-61829 | 3/1997 |
| JP | 9-73075 | 3/1997 |
| JP | 9-73096 | 3/1997 |
| JP | H09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 * | 1/1999 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-262988 | 9/2000 |
| JP | 2000-272799 | 10/2000 |
| JP | 2000-284295 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |

| | | | | | |
|---|---|---|---|---|---|
| JP | 2001-142074 | 5/2001 | JP | 2002-122873 | 4/2002 |
| JP | 2001-147437 | 5/2001 | JP | 2002-131762 | 5/2002 |
| JP | 2001-154211 | 6/2001 | JP | 2002-139734 | 5/2002 |
| JP | 2001-166272 | 6/2001 | JP | 2002-156518 | 5/2002 |
| JP | 2001-166310 | 6/2001 | JP | 2002-169166 | 6/2002 |
| JP | 2001-183683 | 7/2001 | JP | 2002-169167 | 6/2002 |
| JP | 2001-201750 | 7/2001 | JP | 2002-182222 | 6/2002 |
| JP | 2001-209052 | 8/2001 | JP | 2002-202512 | 7/2002 |
| JP | 2001-209056 | 8/2001 | JP | 2002-202514 | 7/2002 |
| JP | 2001-209057 | 8/2001 | JP | 2002-214626 | 7/2002 |
| JP | 2001-209058 | 8/2001 | JP | 2002-229042 | 8/2002 |
| JP | 2001-209060 | 8/2001 | JP | 2002-236276 | 8/2002 |
| JP | 2001-215459 | 8/2001 | JP | 2002-258299 | 8/2002 |
| JP | 2001-222017 | 8/2001 | JP | 2002-236292 | 9/2002 |
| JP | 2001-235758 | 8/2001 | JP | 2002-277865 | 9/2002 |
| JP | 2001-255542 | 9/2001 | JP | 2002-277866 | 9/2002 |
| JP | 2001-264782 | 9/2001 | JP | 2002-277881 | 9/2002 |
| JP | 2001-272640 | 10/2001 | JP | 2002-287156 | 10/2002 |
| JP | 2001-281675 | 10/2001 | JP | 2002-296605 | 10/2002 |
| JP | 2001-281678 | 10/2001 | JP | 2002-311438 | 10/2002 |
| JP | 2001-282126 | 10/2001 | JP | 2002-311440 | 10/2002 |
| JP | 2001-305563 | 10/2001 | JP | 2002-311442 | 10/2002 |
| JP | 2001-330837 | 11/2001 | JP | 2002-323687 | 11/2002 |
| JP | 2001-330840 | 11/2001 | JP | 2002-323694 | 11/2002 |
| JP | 2001-356353 | 12/2001 | JP | 2002-333628 | 11/2002 |
| JP | 2001-356354 | 12/2001 | JP | 2002-333635 | 11/2002 |
| JP | 2001356353 A * | 12/2001 | JP | 2002-333843 | 11/2002 |
| JP | 2002-14360 | 1/2002 | JP | 2002-341329 | 11/2002 |
| JP | 2002-23176 | 1/2002 | JP | 2002-341355 | 11/2002 |
| JP | 2002-49045 | 2/2002 | JP | 2002-341356 | 11/2002 |
| JP | 2002-079160 | 3/2002 | JP | 2002-341357 | 11/2002 |
| JP | 2002-080321 | 3/2002 | JP | 2002-341358 | 11/2002 |
| JP | 2002-82340 | 3/2002 | JP | 2002-341359 | 11/2002 |
| JP | 2002-90759 | 3/2002 | JP | 2002-341362 | 11/2002 |
| JP | 2002-90760 | 3/2002 | KR | 2000-0035302 | 6/2000 |
| JP | 2002-107740 | 4/2002 | WO | WO 86/03366 | 6/1986 |
| JP | 2002-122870 | 4/2002 | | | |
| JP | 2002-122872 | 4/2002 | | | |

* cited by examiner

DISPENSER SYSTEM FOR LIQUID CRYSTAL DISPLAY PANEL, DISPENSING METHOD USING THE SAME, AND METHOD OF FABRICATING LIQUID CRYSTAL DISPLAY PANEL USING DISPENSER SYSTEM AND DISPENSING METHOD

The present invention application claims the benefit of the Korean Application No. P2002-070489 filed on Nov. 13, 2002, which is hereby incorporated by reference.

BACKGROUND OF THE INVENTION

1. Field of the Invention

The present invention relates to a dispenser, a method of using a dispenser, and a method of fabrication, and more particularly, to a dispenser system for a liquid crystal display panel, a dispensing method using a dispenser system, and a method of fabricating a liquid crystal display panel using a dispenser system and a dispensing method.

2. Discussion of the Related Art

In general, operation of a liquid crystal display panel includes individually transmitting data signals according to image information to liquid crystal cells arranged in a matrix configuration, wherein light transmittance of the liquid crystal cells is controlled to display an image. The liquid crystal display device includes a liquid crystal display panel where the liquid crystal cells are arranged in a matrix configuration and a driver integrated circuit (IC) for driving the liquid crystal cells. In addition, the liquid crystal display panel includes a color filter substrate and a thin film transistor array substrate attached to each other, wherein a liquid crystal layer is disposed between the color filter and thin film transistor array substrates.

The thin film substrate includes data lines and gate lines formed to intersect at right angles, thereby defining a liquid crystal cell at every intersection of the data and gate lines. The data lines transmit data signals supplied from the data driver integrated circuit to the liquid crystal cells, and the gate lines transmit scan signals supplied from the gate driver integrated circuit to the liquid crystal cells. In addition, data pads and gate pads are provided for each of the data and gate lines, respectively. The gate driver integrated circuit sequentially supplies the scan signals to the gate lines to sequentially select the gate lines on a one-by-one basis, and the data signals are supplied to a selected one data line by the data driver integrated circuit.

A common electrode and a plurality of pixel electrodes are formed along inner surfaces of the color filter and thin film transistor array substrates, respectively, and apply an electric field to the liquid crystal layer. Each of the pixel electrodes is formed at each liquid crystal cell on the thin film transistor array substrate, and the common electrode is integrally formed along the entire inner surface of the color filter substrate. Accordingly, by controlling voltages supplied to the pixel electrode and the common electrode, light transmittance of the liquid crystal cells can be individually controlled. In order to control the voltages supplied to the pixel electrode, a thin film transistor, which functions as a switching device, is formed at each of the liquid crystal cells.

FIG. 1 is a plan view of a liquid crystal display panel according to the related art. In FIG. 1, a liquid crystal display panel 100 includes an image display part 113 where a plurality of liquid crystal cells are arranged in a matrix configuration, a gate pad part 114 connected to gate lines of the image display part 113, and a data pad part 115 connected to data lines of the image display part 113. The gate pad part 114 and the data pad part 115 are formed along an edge region of a thin film transistor array substrate 101, which does not overlap with a color filter substrate 102. The gate pad part 114 supplies scan signals from the gate driver integrated circuit to the gate lines of the image display part 113, and the data pad part 115 supplies image data from the data driver integrated circuit to the data lines of the image display part 113. In addition, a thin film transistor for switching the liquid crystal cells is provided at the intersection of the data and gate lines. A pixel electrode for driving the liquid crystal cells connected to the thin film transistor is provided on the thin film transistor array substrate 101, and a passivation film for protecting the pixel electrode and the thin film transistors is formed along an entire surface of the thin film transistor array substrate 101. Color filters are separately coated at the cell regions using a black matrix, and a common transparent electrode is provided on the color filter substrate 102. Moreover, a cell gap is formed using a spacer between the thin film transistor array substrate 101 and the color filter substrate 102 when the thin film transistor and color filter substrates 101 and 102 are attached using a seal pattern 116 formed along outer edges of the image display part 113, thereby forming a unit liquid crystal display panel.

During fabrication of the unit liquid crystal display panel, simultaneous formation of the unit liquid crystal display panels on a large-scale glass substrate is commonly adopted. Accordingly, a method requires processes for separating the unit liquid crystal display panels from the large-scale glass substrate by cutting and processing the glass substrate with the plurality of liquid crystal display panels formed thereon. Then, liquid crystal material is injected through a liquid crystal injection opening to form a liquid crystal layer within the cell gap that separates the thin film transistor array and color filter substrates 101 and 102. Next, the liquid crystal injection opening is sealed.

FIGS. 2A and 2B are perspective and sectional views of a seal pattern according to the related art. In FIGS. 2A and 2B, a screen printing method includes patterning a screen mask 206 so that a seal pattern forming region is selectively exposed, selectively supplying a sealant 203 onto the substrate 200 using a rubber squeegee 208 through the screen mask 206 to form the seal patterns 216A~216C, and drying the seal patterns 216A~216C by evaporating a solvent contained in the seal patterns 216A~216C and leveling it. The seal patterns 216A~216C formed on the substrate 200 provide for a gap to which liquid crystal material is injected, and prevent leakage of the injected liquid crystal material. Accordingly, the seal patterns 216A~216C are formed along outer edges of the image display parts 213A~213C of the substrate 200 and liquid crystal injection openings 204A~204C are formed at one side of the seal patterns 216A~216C.

The screen printing method is commonly used because of its convenience, but is disadvantageous in that a significant amount of the sealant 203 is consumed since the sealant 203 is applied along an entire surface of the screen mask 206, and is printed using the rubber squeegee 208 to form the seal patterns 216A~216C. In addition, the screen printing method destroys a rubbing of an orientation film (not shown) formed on the substrate 200 as the screen mask 206 and the substrate 200 contact each other, thereby degrading image quality of the liquid crystal display device. Thus, a seal dispensing method has been developed.

FIG. 3 is a perspective view of another seal pattern according to the related art. In FIG. 3, a table 310 is loaded with a substrate 300, which is moved along forward/backward and left/right directions. A plurality of seal patterns 316A~316C are simultaneously formed along each outer edge of the image display parts 313A~313C of the substrate 300 by applying a certain pressure to a plurality of syringes 301A~301C filled with a sealant, which are aligned and fixed by a support 314. Since the sealant is selectively supplied only along the outer edges of the image display parts 313A~313C of the substrate 300 to form the plurality of seal patterns 316A~316C, sealant consumption can be reduced. In addition, since the syringes 301A~301C do not contact the orientation film (not shown) of the image display parts 313A~313C of the substrate 300, the rubbed orientation film will not be damaged and image quality of the liquid crystal display device can be improved. However, the dispensing of the sealant is problematic since is cannot adjust for situations where the substrate 300 has an enlarged area or where a size of the image display parts 313A~313C formed on the substrate 300 changes according to changes of the liquid crystal display panel.

For example, as the liquid crystal display panel is enlarged, the area of the substrate 300 also is increased to fabricate a large-scale liquid crystal display panel. Accordingly, since positions of the seal patterns 316A~316C to be formed on the substrate 300 change, the support 314 and the syringes 301A~301C must be reconfigured to accommodate the larger sized liquid crystal display panel. Likewise, when the liquid crystal display panels change, the area of the image display parts 313A~313C formed on the substrate 300 changes and the positions of the seal patterns 316A~316C change at each of the outer edges of the image display parts 313A~313C. Thus, the support 314 and the syringes 301A~301C must be reconfigured, thereby causing delays in processing time and a degradation of productivity.

SUMMARY OF THE INVENTION

Accordingly, the present invention is directed to a dispenser system for a liquid crystal display panel, a dispensing method using a dispenser system, and a method of fabricating a liquid crystal display device using a dispenser system and a dispensing method that substantially obviates one or more of the problems due to limitations and disadvantages of the related art.

An object of the present invention is to provide a dispenser system for a liquid crystal display panel that improves productivity and efficiency.

Another object of the present invention is to provide a method of using a dispenser system for a liquid crystal display panel that improves productivity and efficiency.

Another object of the present invention is to provide a method of fabricating a liquid crystal display panel using a dispenser system and a dispensing method that improves productivity and efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a dispenser system for a liquid crystal display panel includes at least one table upon which a substrate having a plurality of image display parts is loaded, a plurality of syringes each having a nozzle at one end portion for supplying a dispensing material onto the substrate, and a plurality of robot arms having the plurality of syringes arranged at both sides of the table.

In another aspect, a dispensing method for a liquid crystal display panel includes mounting a plurality of syringes each having a nozzle at one end portion at a plurality of robot arms arranged at opposing sides of a table, loading a substrate onto the table, and supplying a dispensing material through the nozzles onto the substrate.

In another aspect, a dispensing method for a liquid crystal display panel includes mounting a plurality of syringes each having a nozzle at one end portion at a plurality of robot arms arranged at opposing sides of first and second tables, loading a substrate having first and second image display parts onto the first table, forming a plurality of first seal patterns along outer edges of the first image display parts by using the syringes, loading the substrate having the first plurality of seal patterns onto the second table, and forming a second plurality of seal patterns along outer edges of the second plurality of image display parts by using the syringes.

In another aspect, a dispensing method for a liquid crystal display panel includes mounting a plurality of syringes each having a nozzle at one end portion at a plurality of robot arms arranged at opposing sides of first, second, and third tables, loading a substrate having a plurality of image display parts onto the first table, forming a plurality of seal patterns along outer edges of the image display parts using the syringes, loading the substrate having the plurality of seal patterns onto the second table, dropping liquid crystal material onto the image display parts using the syringes, loading the substrate having liquid crystal material onto the third table, and forming a plurality of silver dots at the outer edges of the image display parts using the syringes.

In another aspect, a method of fabricating a liquid crystal display panel includes forming a plurality of seal patterns along outer edges of a plurality of image display parts of a first substrate using the a first plurality of syringes, dropping liquid crystal material onto the image display parts using a second plurality of syringes, and forming a plurality of silver dots at the outer edges of the image display parts using a third plurality of syringes.

In another aspect, a method of fabricating a liquid crystal display panel includes mounting a plurality of syringes each having a nozzle at one end portion at a plurality of robot arms arranged at opposing sides of a table, loading a substrate onto the table, and supplying a dispensing material through the nozzles onto the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
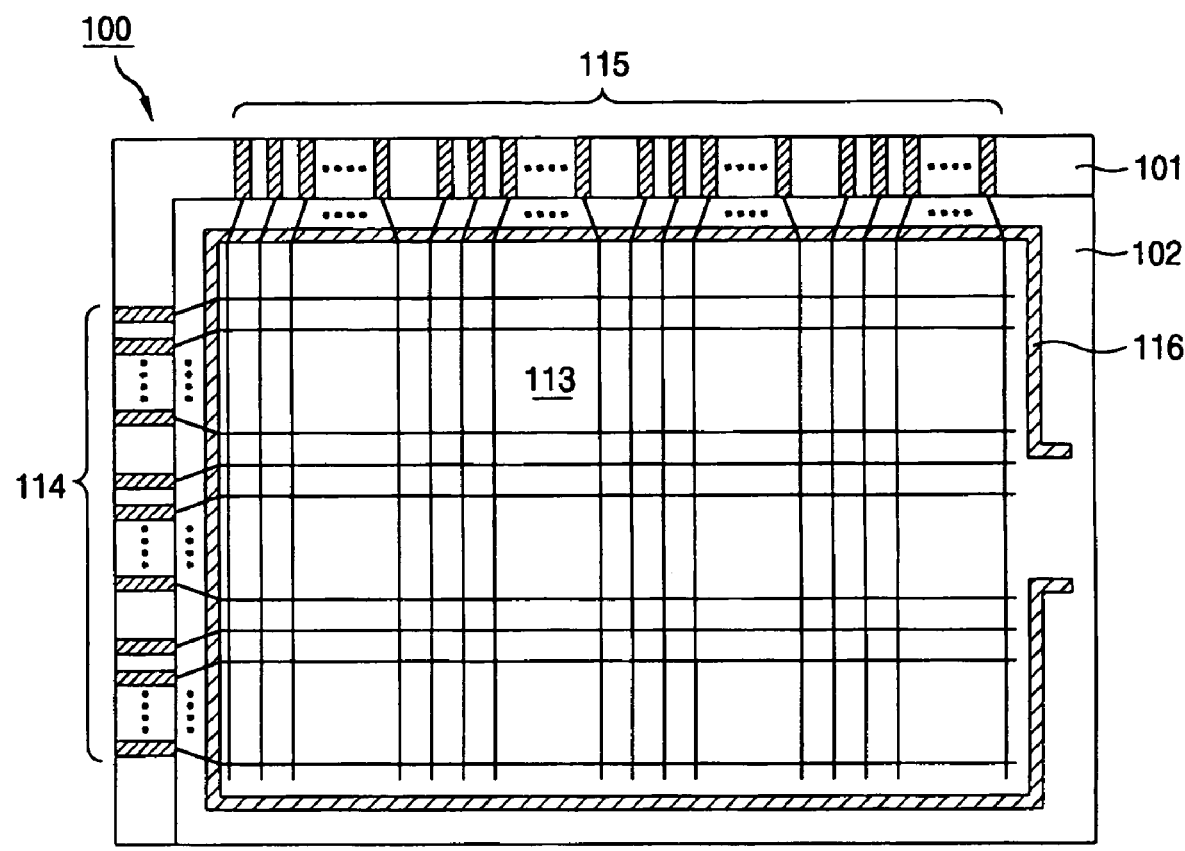
FIG. 1 is a plan view of a liquid crystal display panel according to the related art.
Figure 2A:
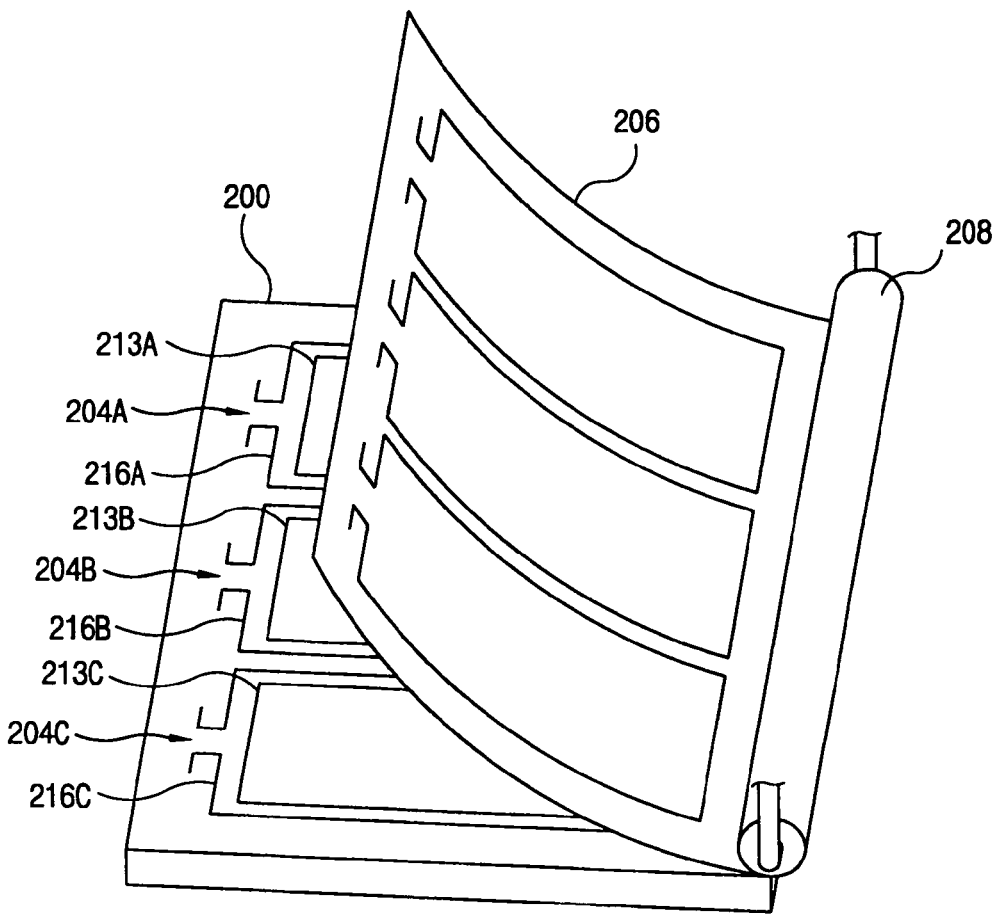
FIGS. 2A and 2B are perspective and sectional views of a seal pattern according to the related art.
Figure 2B:
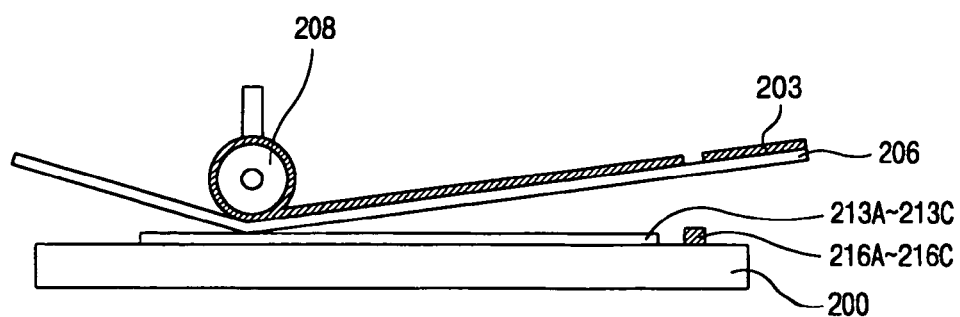
Figure 3:
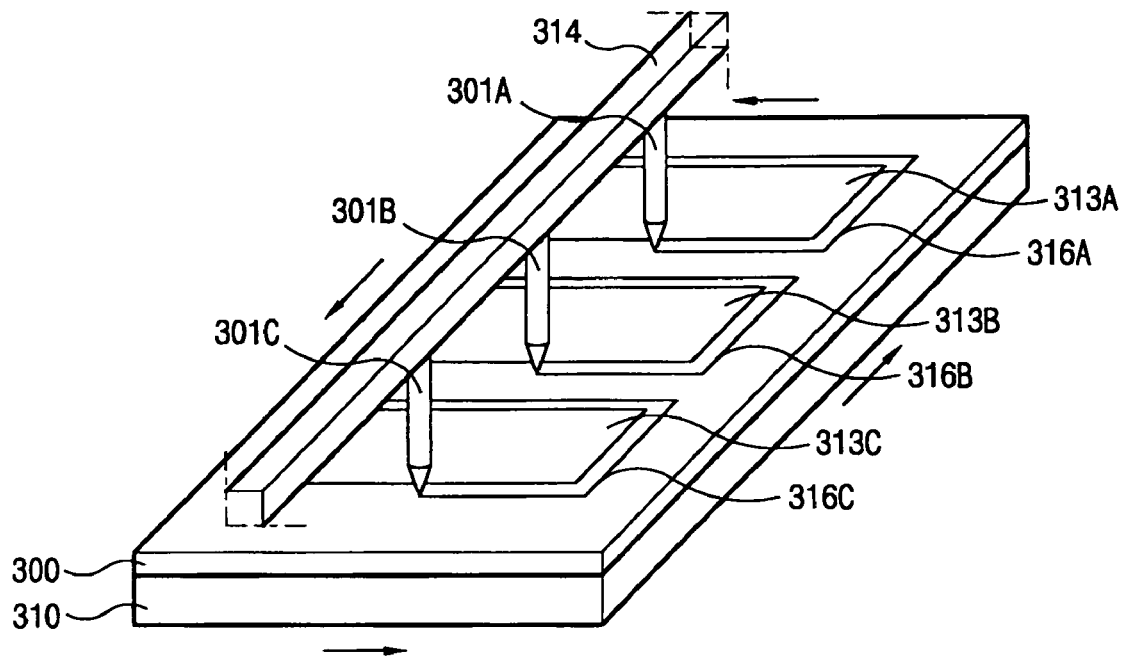
FIG. 3 is a perspective view of another seal pattern according to the related art.
Figure 4:
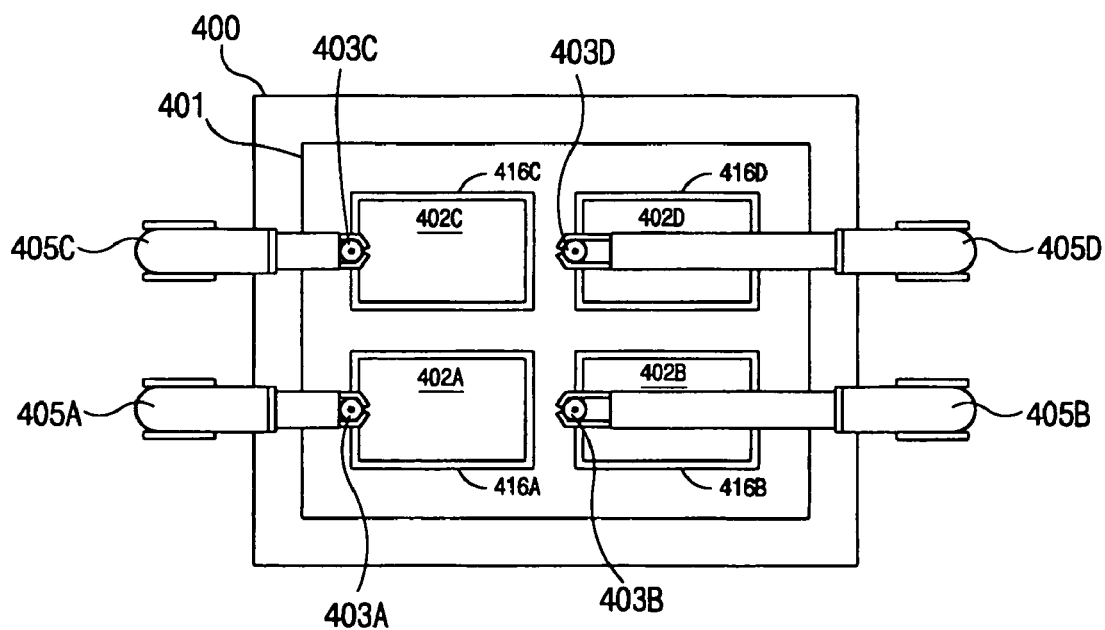
FIG. 4 is a plan view of an exemplary seal dispenser system of a liquid crystal display panel according to the present invention.

FIG. 4 is a plan view of an exemplary seal dispenser system of a liquid crystal display panel according to the present invention. In FIG. 4, a dispenser system for a liquid crystal display panel may include a substrate 401 upon which a plurality of image display parts 402A~402D may be formed, a table 400 upon which the substrate 401 may be loaded, a plurality of syringes 403A~403D that may contain a sealant, a plurality of nozzles provided at end portions of the syringes 403A~403D supply the sealant along outer edges of the image display parts 402A~402D of the substrate 401 to form a plurality of seal patterns 416A~416D, and a plurality of robot arms 405A~405D each having one of the syringes 403A~403D disposed along sides of the table 400. The substrate 401 may be a large-scale first glass substrate upon which a plurality of thin film transistor array substrates may be fabricated or may be a large-scale second glass substrate upon which a plurality of color filter substrates may be fabricated.

As the relative position between the table 400 and the plurality of syringes 403A~403D may change, by moving either the table 400 or the plurality of syringes 403A~403D, the sealant may be supplied through the nozzles to form a plurality of seal patterns 416A~416D on the substrate 401. However, when the plurality of syringes 403A~403D are moved along horizontal directions, foreign material may be generated by driving of the syringes 403A~403D. Accordingly, the foreign material may be adsorbed onto the image display parts 402A~402D of the substrate 401. Thus, the table 400 may be moved along horizontal forward/backward and left/right directions.

The robot arms 405A~405D that include the syringes 403A~403D may be arranged at both sides of the table 400 to correspond with a number of the image display parts 402A~402D formed on the substrate 401. For example, if the image display parts 402A~402D are formed having an M×N matrix configuration on the substrate 401, a number of the robot arms 405A~405D may be formed at both sides of the table 400 corresponding to the N-number of columns of the M×N matrix configuration of the image display parts 402A~402D.

Figure 5A:
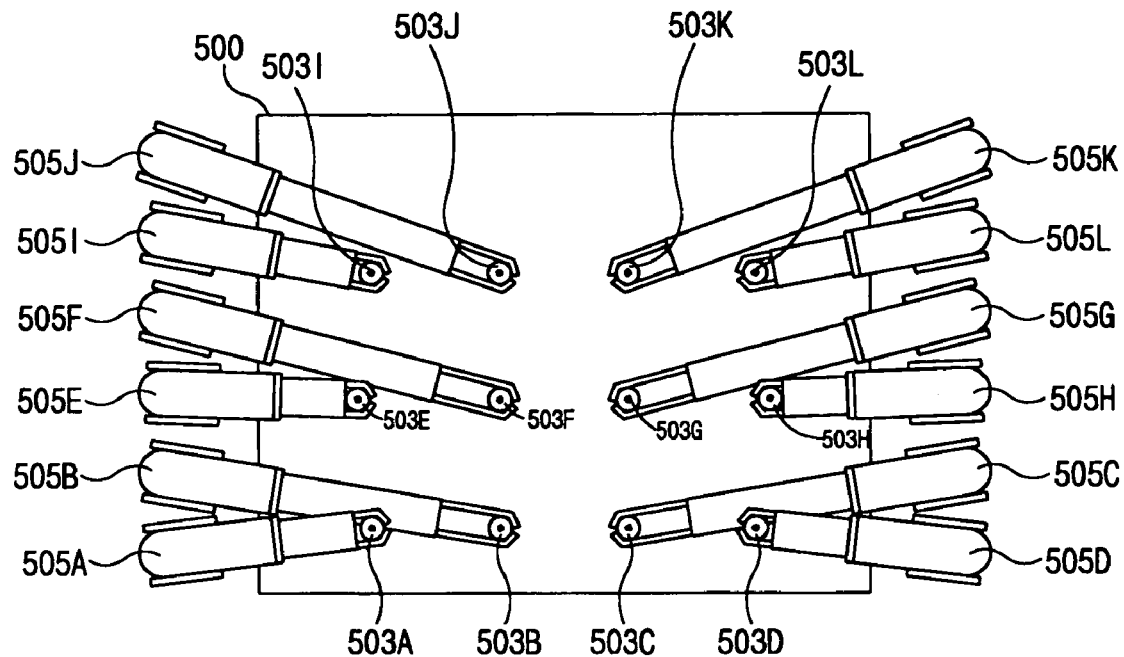
FIGS. 5A to 5C are plan views of an exemplary dispensing method for a liquid crystal display panel according to the present invention.
Figure 5B:
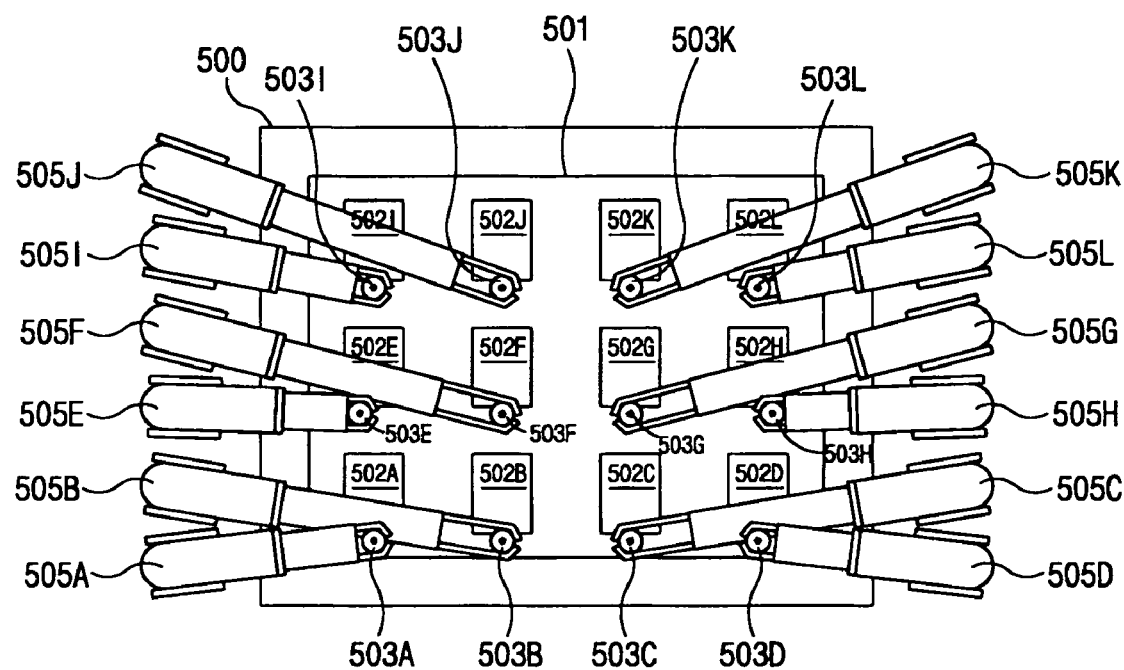
Figure 5C:
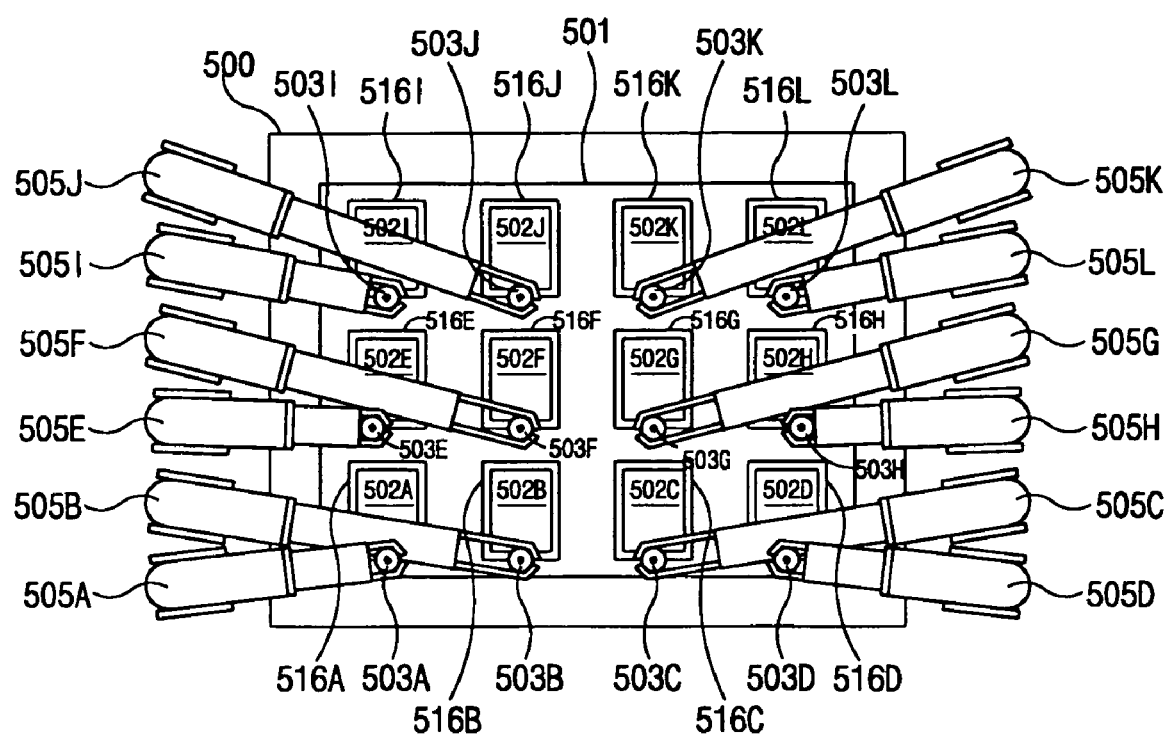

FIGS. 5A to 5C are plan views of an exemplary dispensing method for a liquid crystal display panel according to the present invention. In FIG. 5A, a plurality of syringes 503A~503L may be mounted on robot arms 505A~505L, which may be arranged at both sides of a table 500 according to the total number of the plurality of syringes 503A~503L, and may each include nozzle at end portions thereof.

In FIG. 5B, a substrate 501 upon which image display parts 502A~502L may be formed is loaded onto the table 500.

In FIG. 5C, sealant is supplied through the nozzles provided at end portions of the syringes 503A~503L to form seal patterns 516A~516L along outer edges of the image display parts 502A~502L of the substrate 501.

Accordingly, if the syringes 503A~503L are driven to form the seal patterns 516A~516L, foreign material may be generated and adsorbed onto the image display parts 502A~502L of the substrate 501. Thus, the table 500 may be moved along horizontal forward/backward and left/right directions to form the seal patterns 516A~516L along the outer edges of the image display parts 502A~502L of the substrate 501. In addition, even if an area of the image display parts 502A~502L changes as an area of the substrate 501 increases or as the liquid crystal display panel changes, the robot arms 505A~505L may easily compensate for the changed areas. Thus, reconfiguration of the dispensing system may not be required, thereby increasing productivity and efficiency.

Figure 6A:
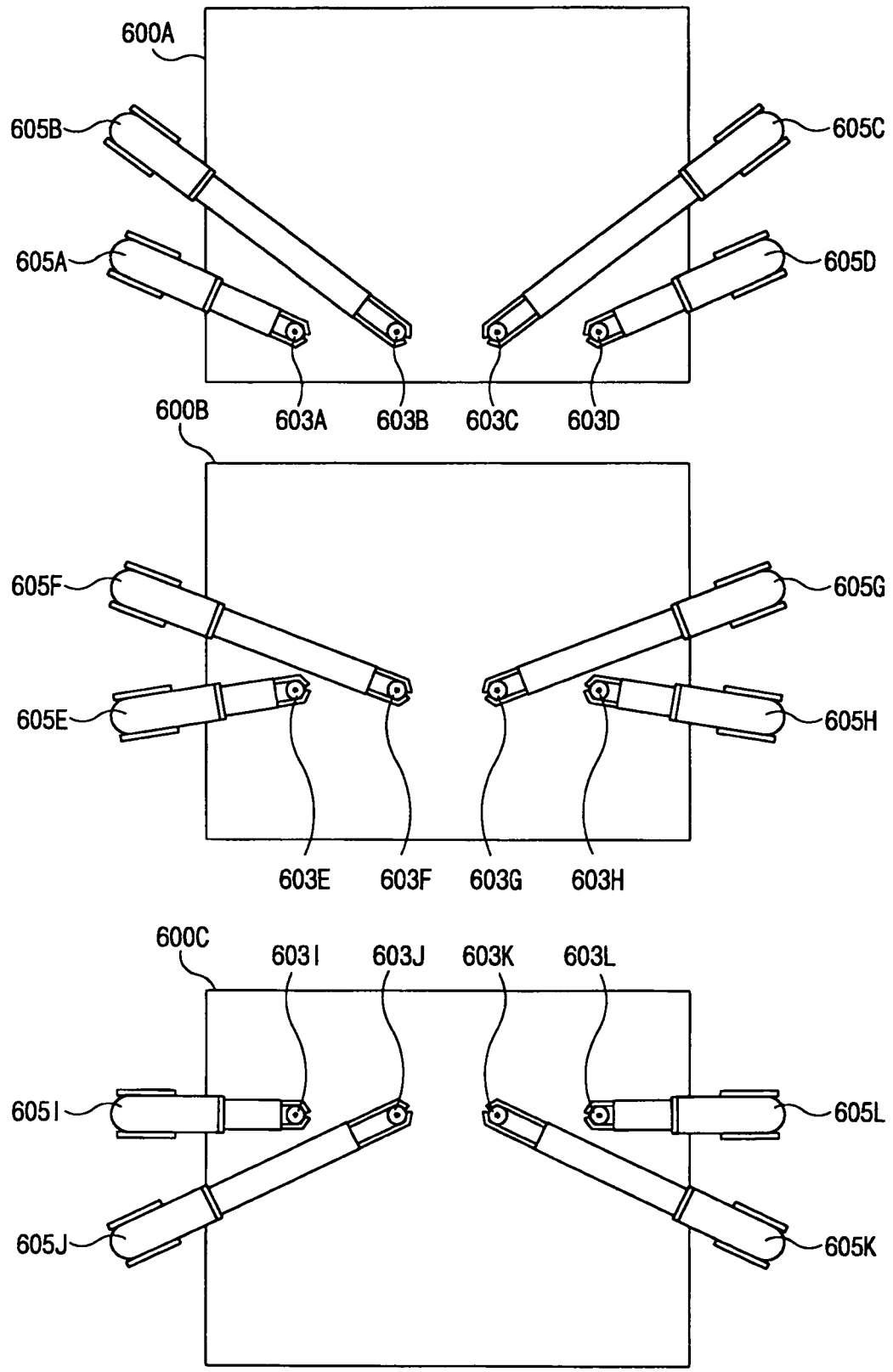
FIGS. 6A to 6G are plan views of another exemplary dispensing method for a liquid crystal display panel according to the present invention.

FIGS. 6A to 6G are plan views of another exemplary dispensing method for a liquid crystal display panel according to the present invention. In FIG. 6A, first to third tables 600A~600C may be independently driven along a convey path of a substrate 601 upon which image display parts 602A~602L may be formed, and a plurality of robot arms 605A~605L may be arranged at both sides of the first to third tables 600A~600C in pairs. Each of the plurality of syringes 603A~603L may include a nozzle at one end portion thereof, and may be individually-mounted at the robot arms 605A~605L.

Figure 6B:
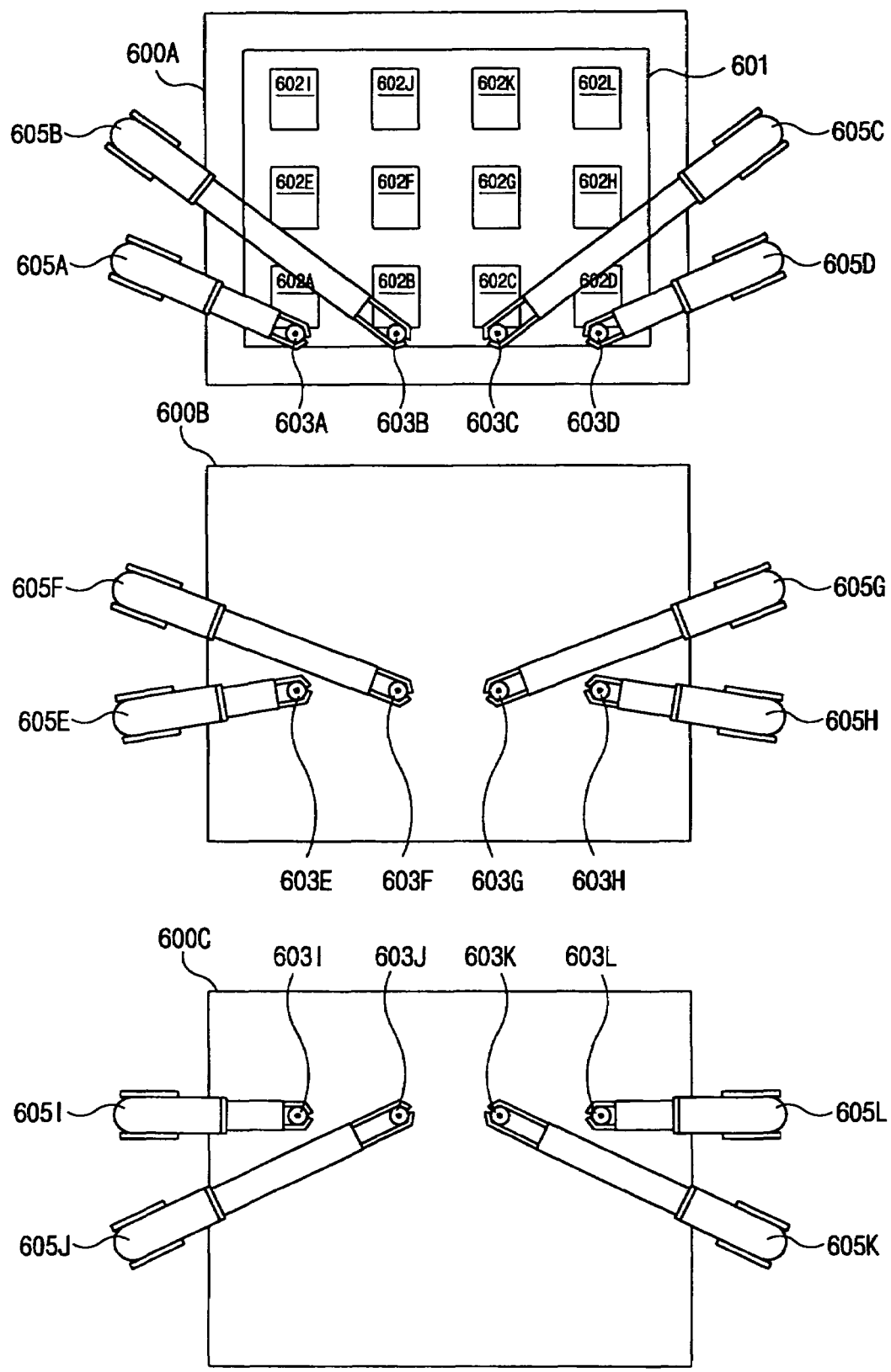

In FIG. 6B, the substrate 601 upon which image display parts 602A~602L may be formed may be loaded onto the first table 600A.

Figure 6C:
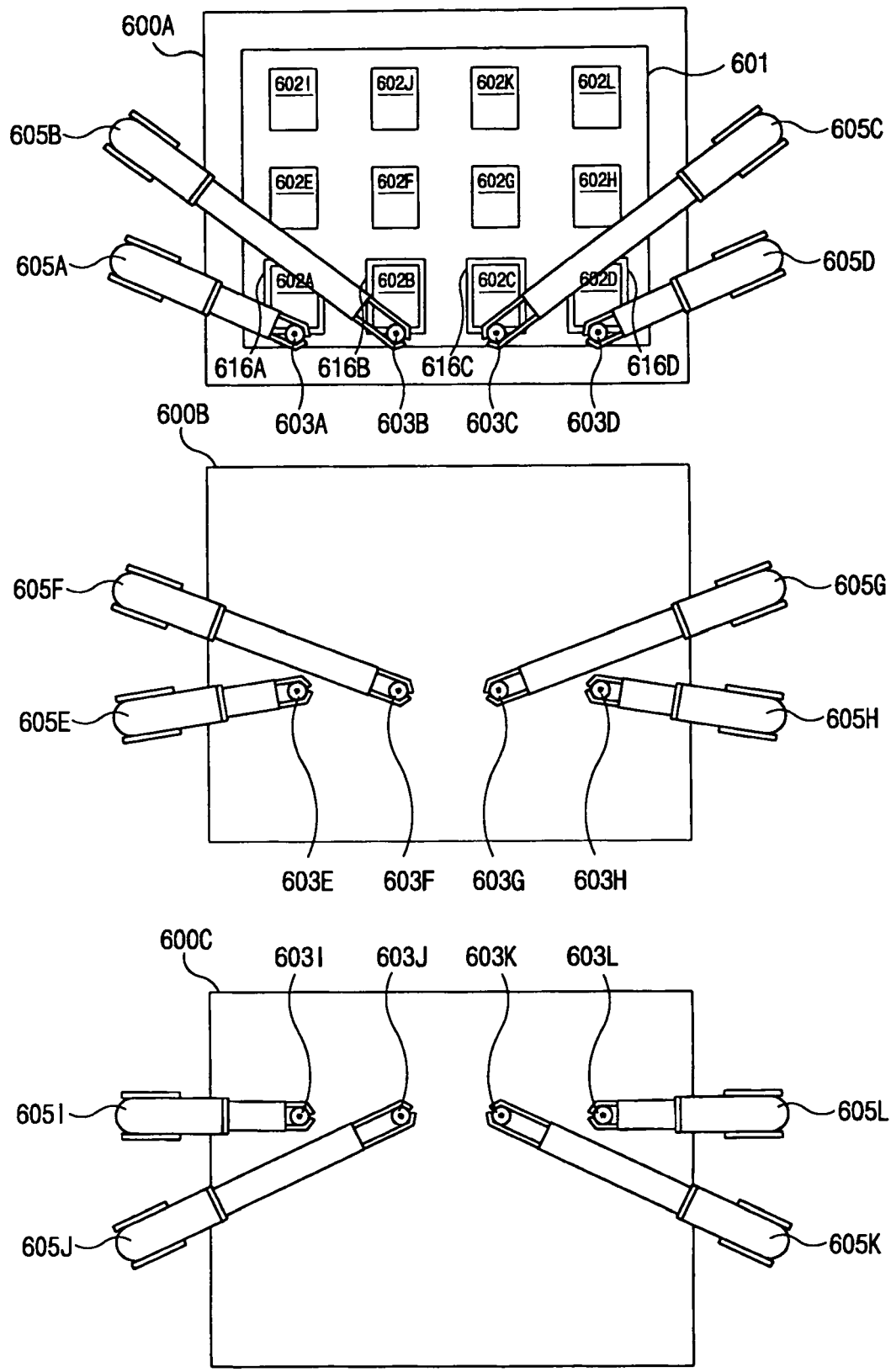

In FIG. 6C, a first plurality of seal patterns 616A~616D may be formed along outer edges of a first group of image display parts 602A~602D of the plurality of image display parts 602A~602L using a first plurality of syringes 603A~603D mounted on a first plurality of robot arms 605A~605D. Accordingly, if the first plurality of syringes 603A~603D are driven to form the first plurality of seal patterns 616A~616D along the outer edges of the first group of image display parts 602A~602D, foreign material may be generated and adsorbed onto the first group of image display parts 602A~602D of the substrate 601. Thus, the first table 600A may be moved along horizontal forward/backward and left/right directions to form the first plurality of seal patterns 616A~616D.

Figure 6D:
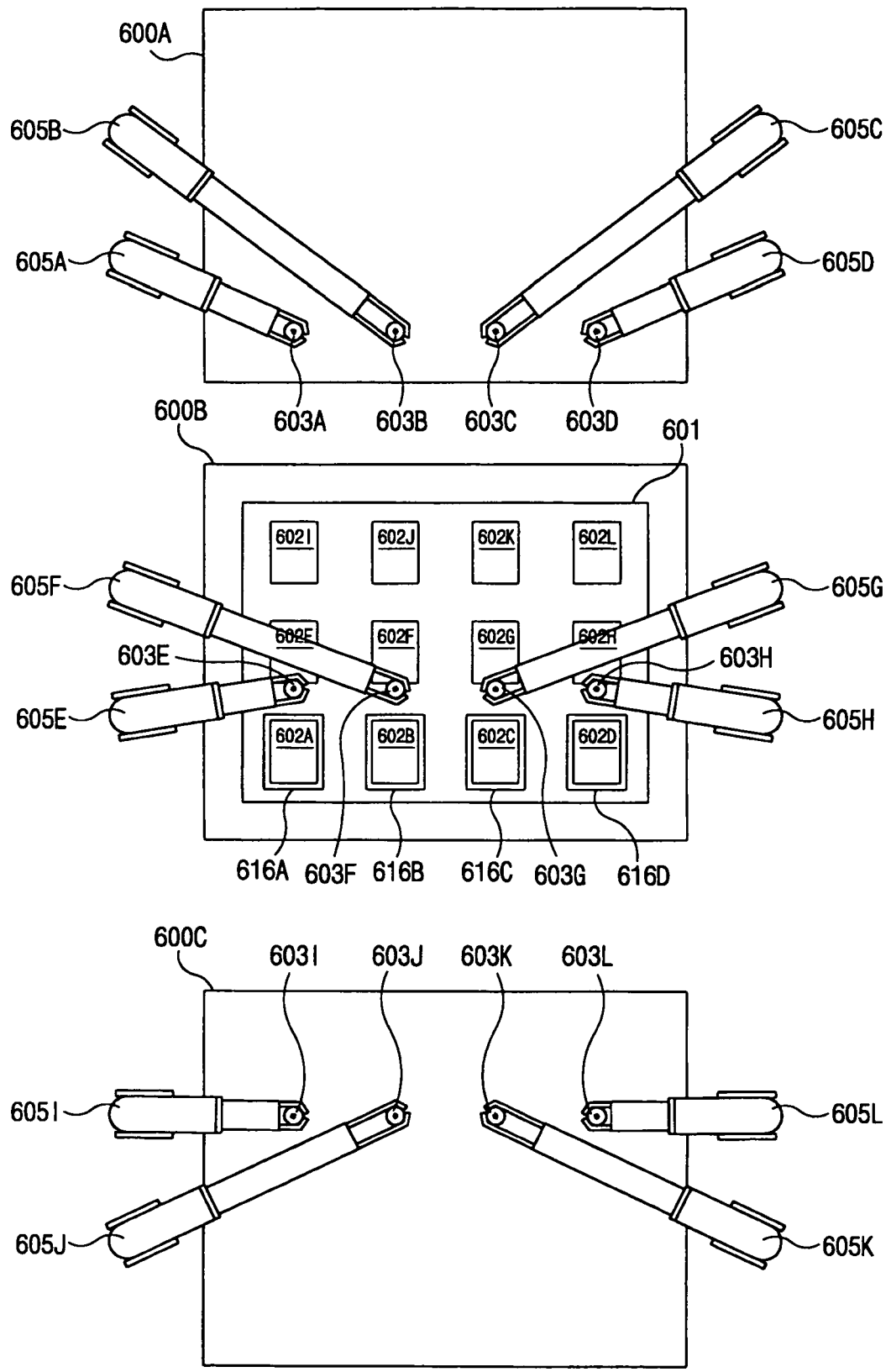

In FIG. 6D, the substrate 601 upon which the first plurality of seal patterns 616A~616D have been formed along the outer edges of the first plurality of image display parts 602A~602D may be loaded on the second table 600B.

Figure 6E:
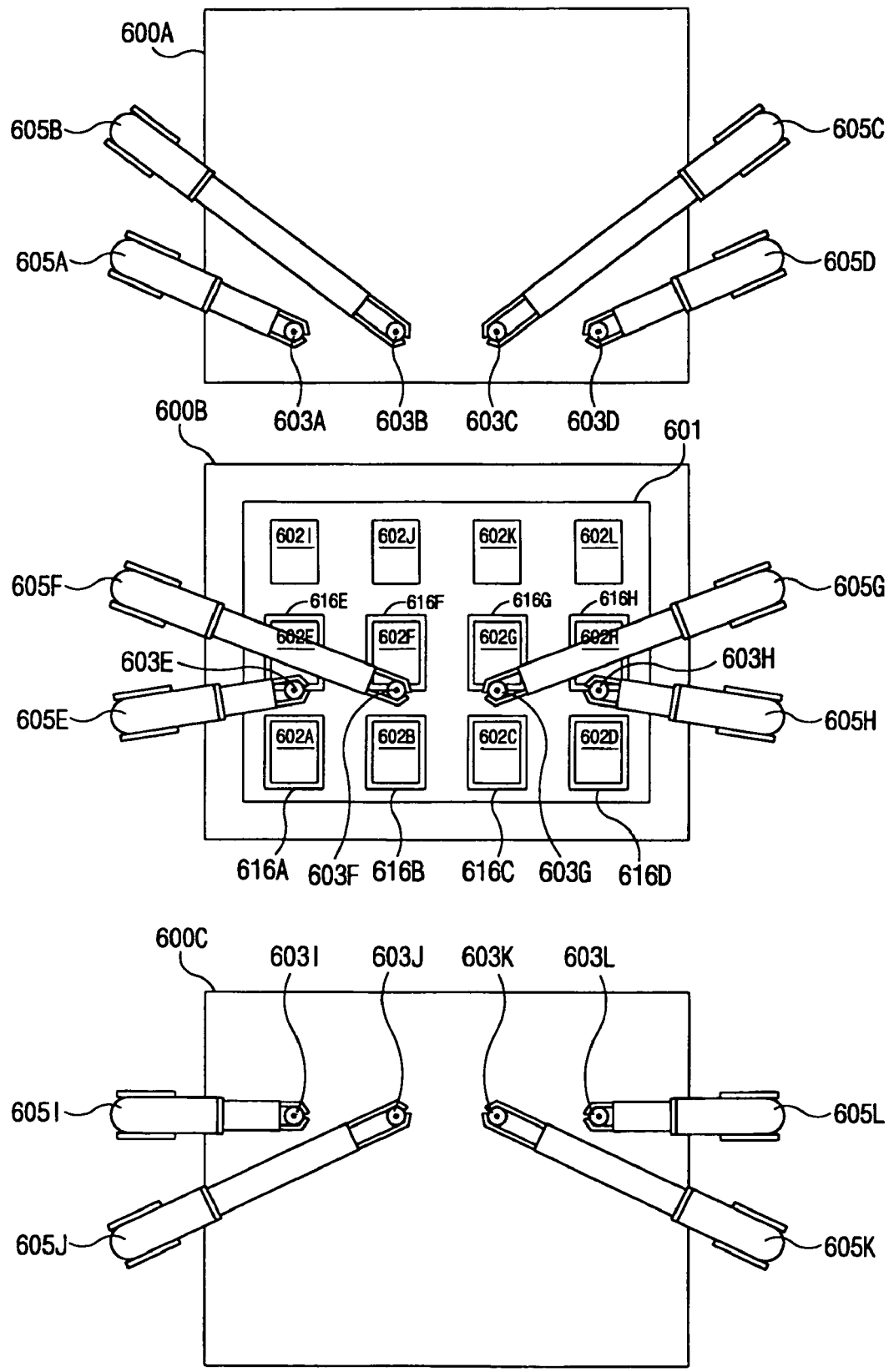

In FIG. 6E, a second plurality of seal patterns 616E~616H may be formed along outer edges of a second plurality of image display parts 602E~602H of the image display parts 602A~602L using a second plurality of syringes 603E~603H mounted on a second plurality of robot arms 605E-605H which are arranged at both sides of the second table 600B in pairs. Accordingly, if the second plurality of syringes 603E~603H are driven to form the second plurality of seal patterns 616E~616H along the outer edges of the second plurality of image display parts 602E~602H, foreign material may be generated and adsorbed onto the first and second pluralities of image display parts 602A~602L of the substrate 601. Thus, the second table 600B may be moved along horizontal forward/backward and left/right directions to form the second plurality of seal patterns 616E~616H.

Figure 6F:
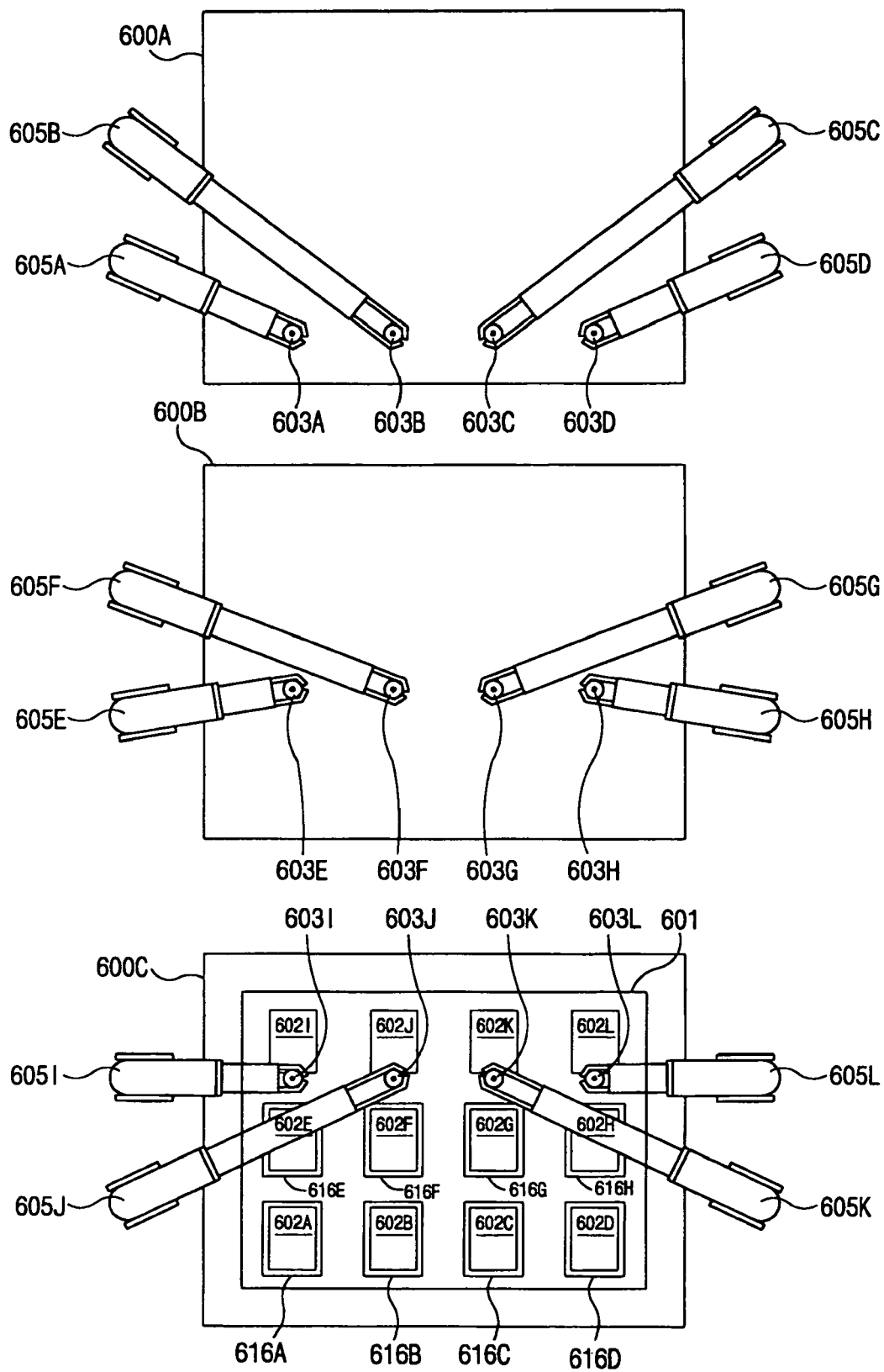

In FIG. 6F, the substrate 601 upon which the first and second seal patterns 616A~616H may have been formed along the outer edges of the first and second pluralities of image display parts 602A~602H may be loaded onto the third table 600C.

Figure 6G:
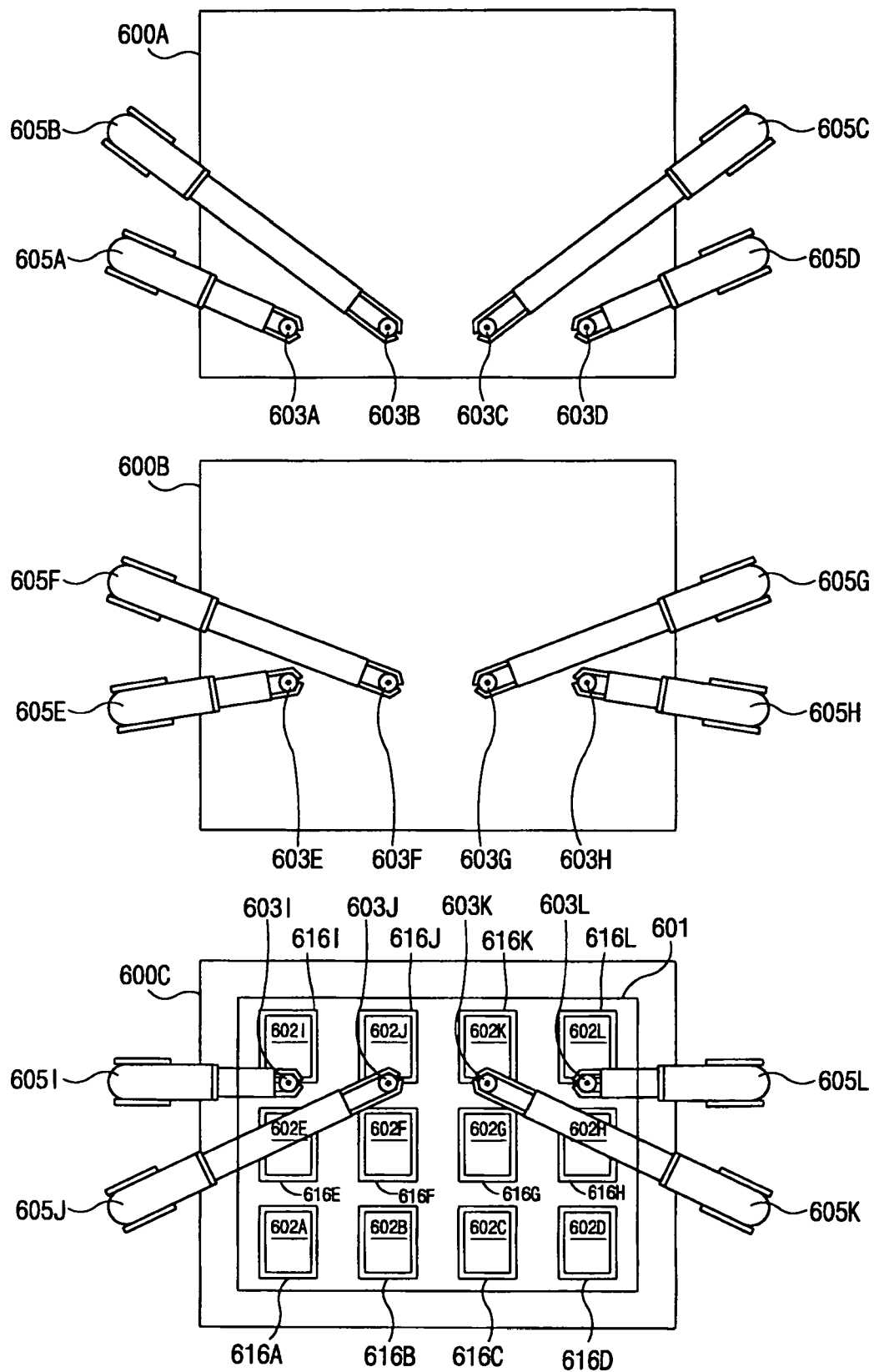

In FIG. 6G, a third plurality of seal patterns 616I~616L may be formed along outer edges of a third plurality of image display parts 602I~602L of the image display parts 602A~602L using a third plurality of syringes 603I~603L mounted on a third plurality of robot arms 605I~605L which may be arranged at both sides of the third table 600C in pairs. Accordingly, if the third plurality of syringes 603I~603L are driven to form the third plurality of seal patterns 616I~616L along the outer edges of the third plurality of image display parts 602I~602L, foreign material may be generated and adsorbed onto the first, second, and third pluralities of image display parts 602A~602L of the substrate 601. Thus, the third table 600C may be moved along horizontal forward/backward and left/right directions to form the third plurality of seal patterns 616I~616L.

Accordingly, the exemplary dispensing method for a liquid crystal display panel of FIGS. 6A-6G may include first, second, and third pluralities of robot arms 601A~605L having first, second, and third pluralities of syringes 603A~603L disposed at both sides of the first to third tables 600A~600C in pairs. In addition, the first to third tables 600A~600C may be independently driven and the first, second, and third pluralities of seal patterns 616A~616L may be formed along the outer edges of the first, second, and third pluralities of image display parts 602A~602L on the substrate 601.

In addition, the first, second, and third pluralities of robot arms 605A~605L may convey the first, second, and third pluralities of syringes 603A~603L to desired positions on the first to third table 600A~600C. Thus, even if an area of the first, second, and third pluralities of image display parts 602A~602L may change as an area of the substrate 601 increases or as the liquid crystal display panel changes, the first, second, and third pluralities of robot arms 605A~605L may easily accommodate the changes. Therefore, reconfiguration of the dispensing system may not be necessary, thereby increasing productivity and efficiency.

FIGS. 7A to 7F are plan views of another exemplary dispensing method using a dispensing system for the liquid crystal display panel of FIGS. 5A to 5C according to the present invention. In FIGS. 7A to 7F, liquid crystal display panels having different sizes may be simultaneously fabricated using a dispenser system for a liquid crystal display panel according to the present invention.

Figure 7A:
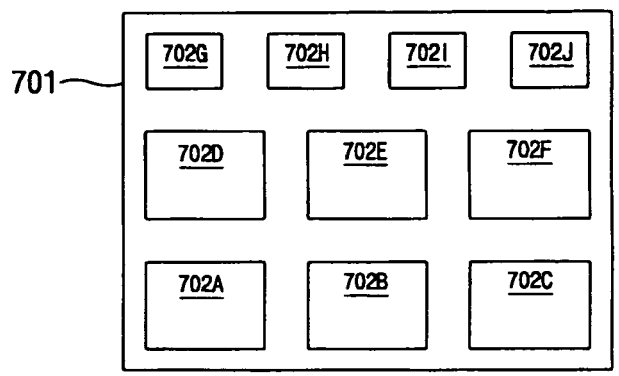
FIGS. 7A to 7F are plan views of another exemplary dispensing method using a dispensing system for the liquid crystal display panel of FIGS. 5A to 5C according to the present invention.

In FIG. 7A, a substrate 701 may include a first plurality of image display parts 702A~702F having a first size and a second plurality of image display parts 702G~702J having a second size different from the first size.

Figure 7B:
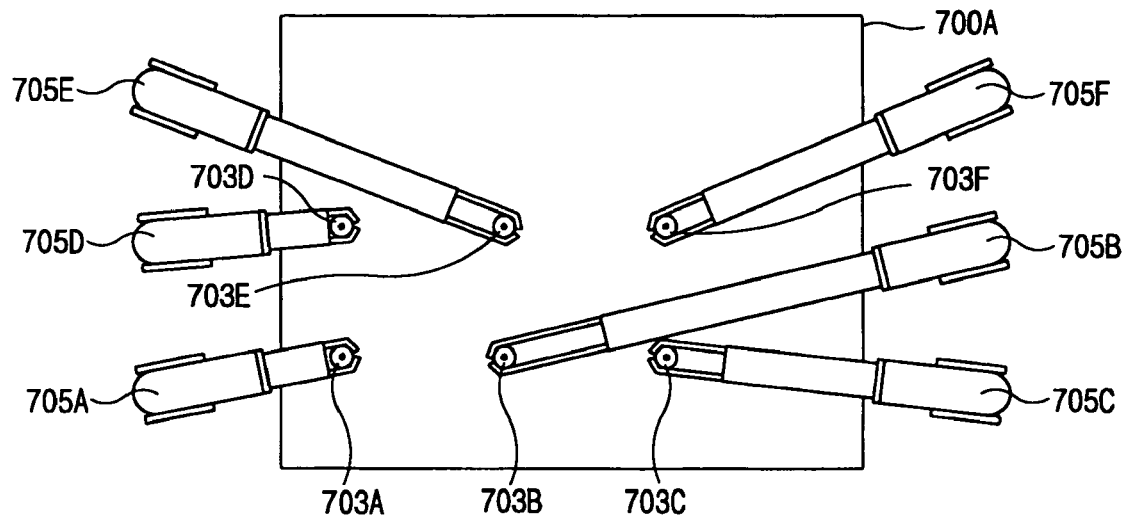
Figure 7B:
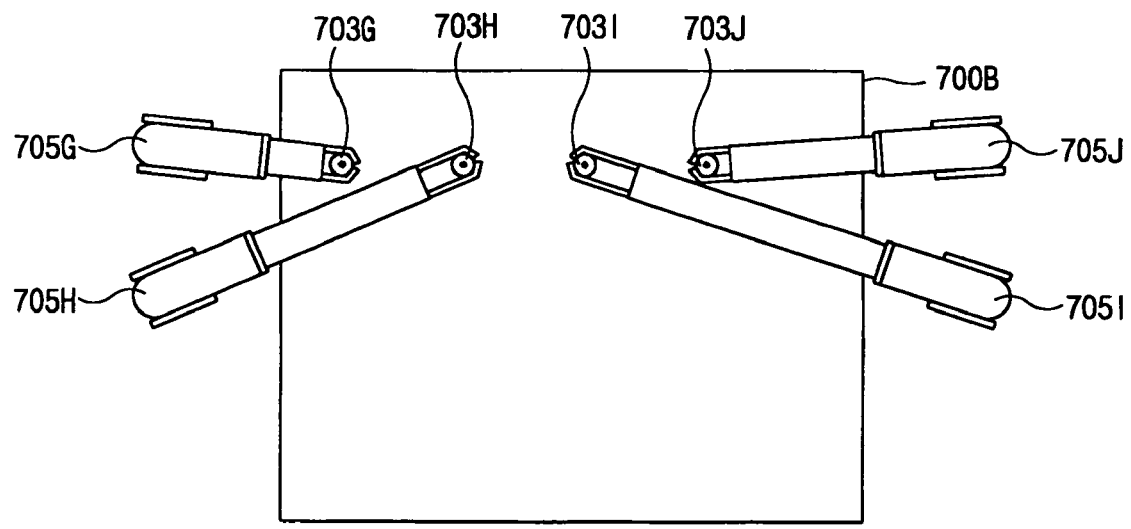

In FIG. 7B, a first table 700A and a second table 700B may be independently driven along a convey path of the substrate 701 with the first plurality of image display parts 702A~702F having the first size and the second plurality of image display parts 702G~702J having the second size formed thereon. In addition, a first plurality of robot arms 705A~705F may be arranged at both sides of the first table 700A to correspond to the first plurality of image display parts 702A~702F in pairs, and a second plurality of robot arms 705G~705J may be arranged at both sides of the second table 700B to corresponding to the second plurality of image display parts 702G~702J in pairs. Moreover, a first plurality of syringes 703A~703J each having a nozzle at one end portion may be provided on the first and second pluralities of robot arms 705A~705J.

Figure 7C:
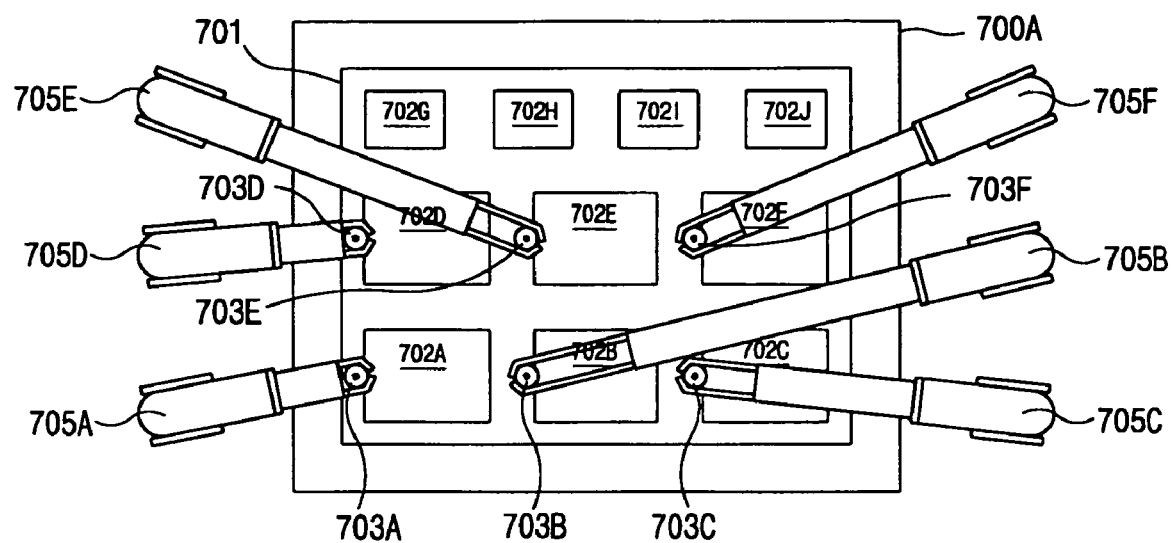
Figure 7C:
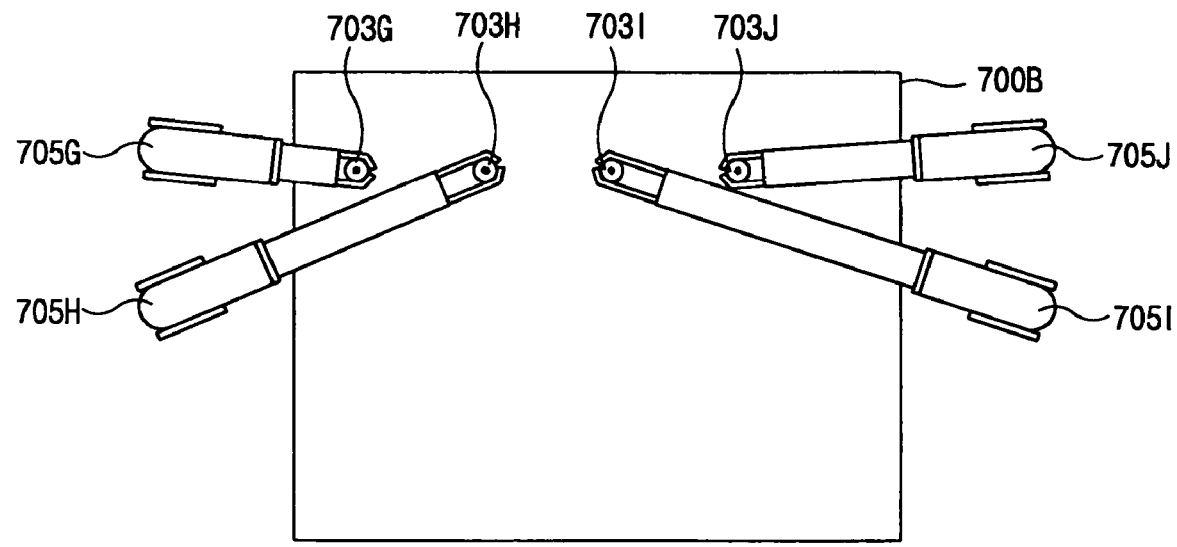

In FIG. 7C, the substrate 701 upon which the first plurality of image display parts 702A~702F having the first size and the second plurality of image display parts 702G~702J having the second size may be loaded on the first table 700A.

Figure 7D:
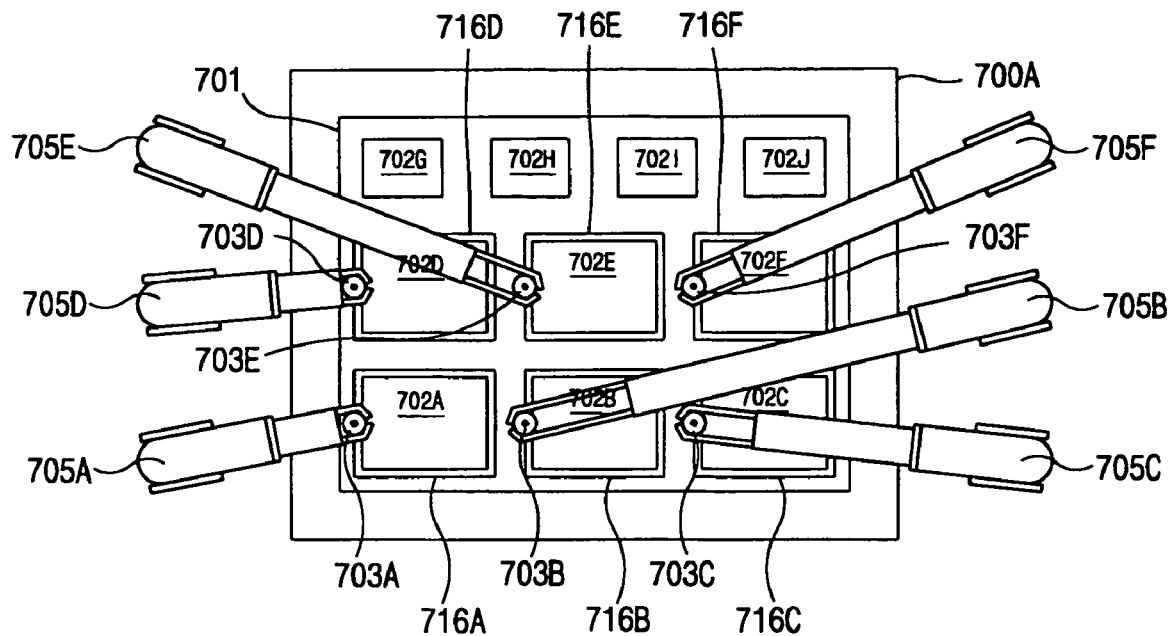
Figure 7D:
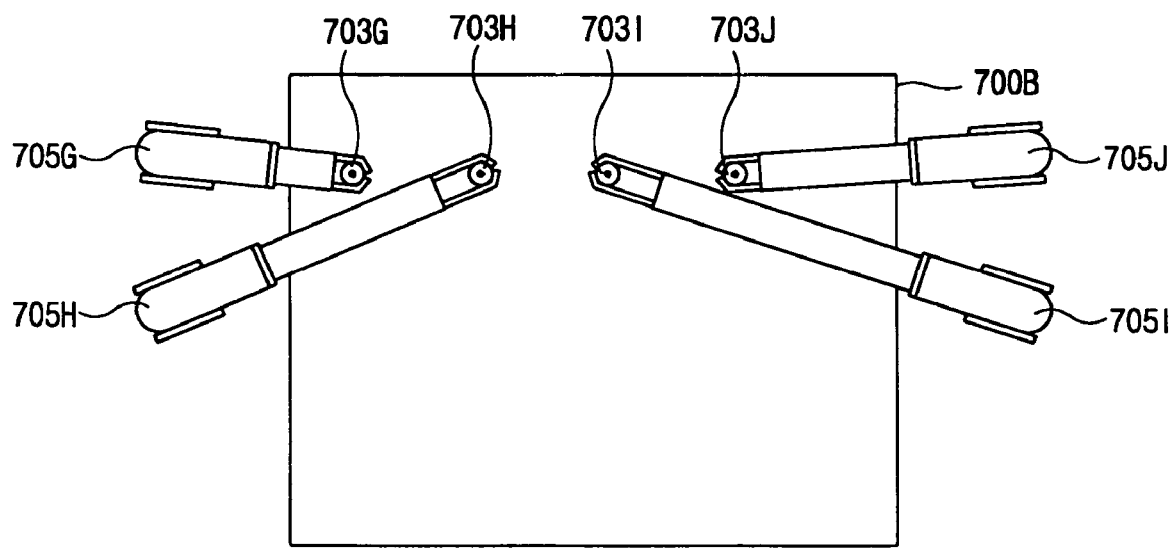

In FIG. 7D, a first plurality of seal patterns 716A~716F may be formed along the outer edges of the first plurality of image display parts 702A~702F using the first plurality of syringes 703A~703F provided on the first plurality of robot arms 705A~705F at both sides of the first table 700A in groups of three. Accordingly, if the first plurality of syringes 703A~703F are driven to form the first plurality of seal patterns 716A~716F, foreign material may be generated and adsorbed onto the first plurality of image display parts 702A~702J of the substrate 701. Thus, the first table 700A may be moved along horizontal forward/backward and left/right directions to form the first plurality of seal patterns 716A~716F.

Figure 7E:
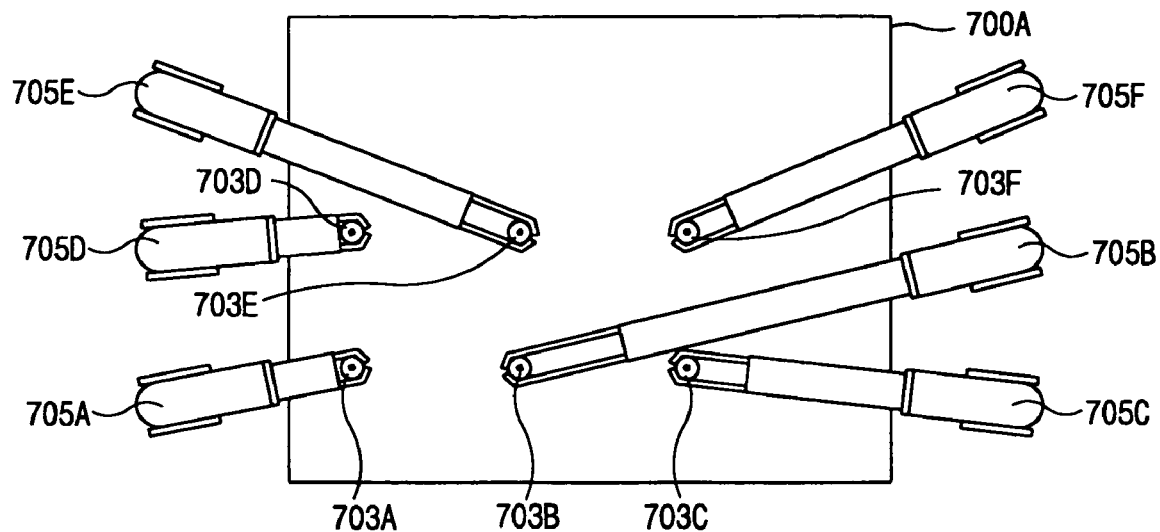
Figure 7E:
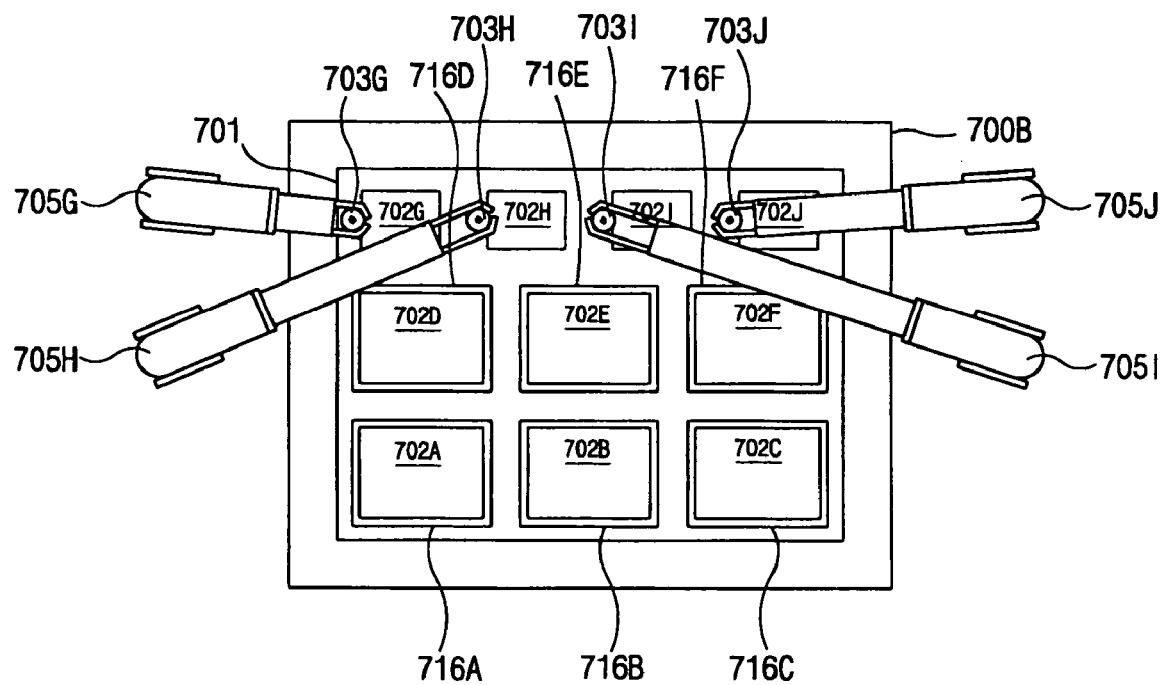

In FIG. 7E, the substrate 701 upon which the first plurality of seal patterns 716A~716F may have been formed along the outer edges of the first plurality of image display parts 702A~702F may be loaded on the second table 700B.

Figure 7F:
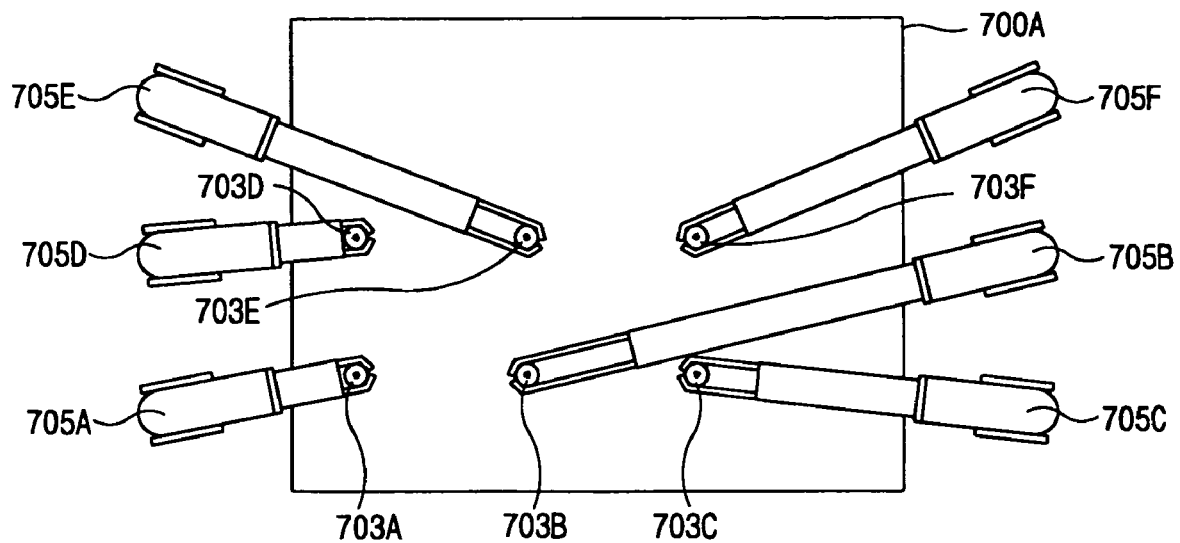
Figure 7F:
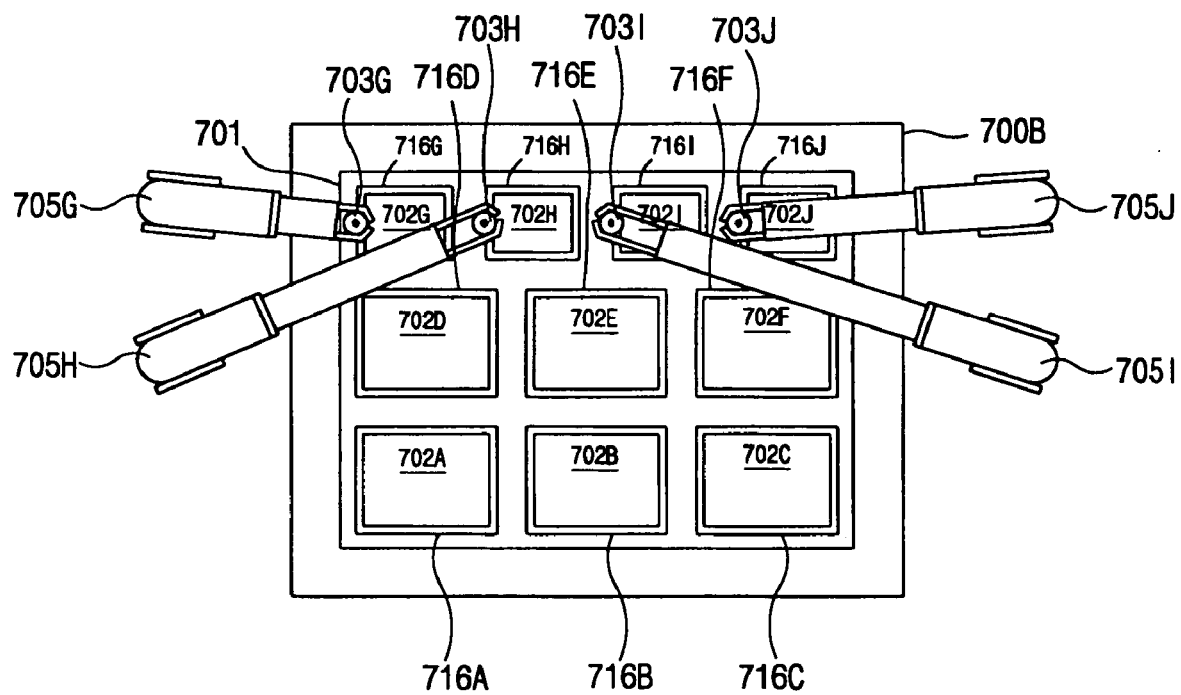

In FIG. 7F, a second plurality of seal patterns 716G~716J may be formed along outer edges of a second plurality of image display parts 702G~702J using a second plurality of syringes 703G~703J provided on a second plurality of robot arms 705G~705J that may be arranged at both sides of the second table 700B in pairs. Accordingly, if the second plurality of syringes 703G~703J are driven to form the second plurality of seal patterns 716G~716J, foreign material may be generated and adsorbed onto the first and second pluralities of image display parts 702A~702J of the substrate 701. Thus, the second table 700B may be moved along horizontal forward/backward and left/right directions to form the second plurality of seal patterns 716G~716J.

Figure 8:
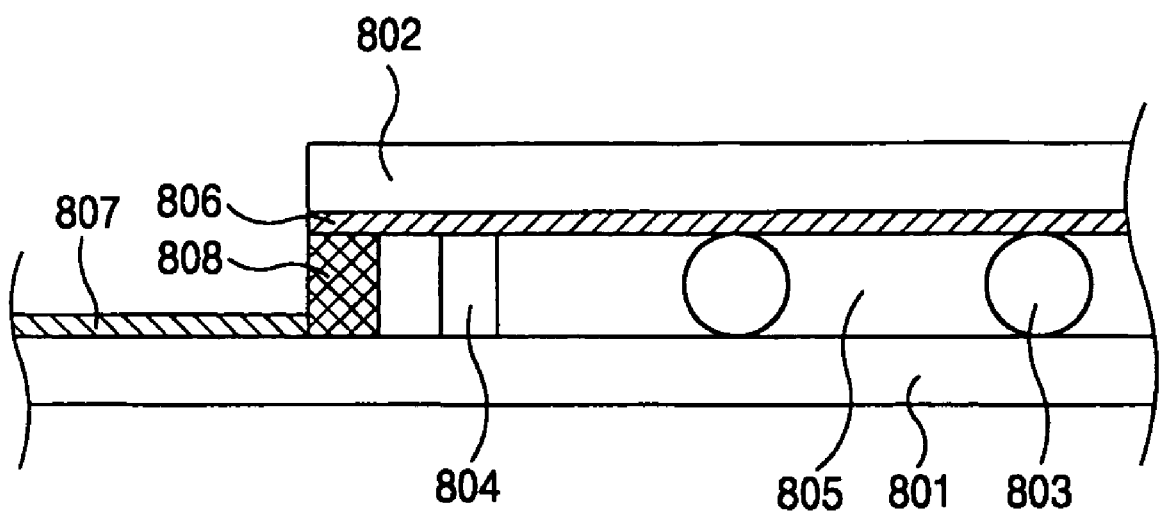
FIG. 8 is a schematic cross sectional of an exemplary edge portion of a liquid crystal display panel according to the present invention.

FIG. 8 is a schematic cross sectional of an exemplary edge portion of a liquid crystal display panel according to the present invention. In FIG. 8, a liquid crystal display panel may be formed such that a thin film transistor array substrate 801 and a color filer substrate 802 are attached in a facing manner having a gap provided by a spacer 803 and a seal pattern 804, wherein a liquid crystal layer 805 may be formed within the gap between the thin film transistor array substrate 801 and the color filter substrate 802. The thin film transistor array substrate 801 may be provided to protrude from the color filter substrate 802, wherein a gate pad part connected to gate lines of the thin film transistor array substrate 801 and a data pad part connected to data lines of the thin film transistor array substrate 801 may be formed on the protrusion of the thin film transistor array substrate 801.

Within an image display part of the thin film transistor array substrate 801, gate lines that receive scan signals via the gate pad part and data lines that receive image data via the data pad part may be arranged to intersect each other, wherein a thin film transistor for switching the liquid crystal cells may be formed at each of the intersections. In addition, a pixel electrode connected to the thin film transistor may be formed within the image display part of the thin film transistor array substrate 801.

Within an image display part of the color filter substrate 802, color filters may be provided at cell regions defined by a black matrix, and a common transparent electrode for driving the liquid crystal layer together with the pixel electrode may be formed on the color filter substrate 802. A common voltage line 807 for supplying a common voltage to the common electrode 806 may be formed on the thin film transistor array substrate 801. Accordingly, a silver (Ag) dot 808 may be formed either on the thin film transistor array substrate 801 or on the color filter substrate 802 to electrically interconnect the common voltage line 807 and the common electrode 806. Thus, the common voltage supplied to the common voltage line 807 may be supplied to the common electrode 806 using the silver dot 808. At least one or more silver dots 808 may be formed at each of the plurality of unit liquid crystal display panels fabricated on a large-scale glass substrate, which may be also formed by using the dispenser system for a liquid crystal display panel according to the present invention. For example, a plurality of syringes filled with silver material may be provided at a plurality of robot arms arranged at both sides of a table. Then, the silver material may be supplied through a nozzle provided at each end portion of the plurality of syringes while moving the table along horizontal directions, thereby forming the silver dots 808 along outer edges of a plurality of image display parts formed on the substrate.

When forming the silver dots 808 along the outer edges of the plurality of image display parts formed on the substrate using a dispenser system of a liquid crystal display panel according to the present invention, the robot arms may convey the syringes to desired positions on the table. Thus, even if an area of the image display parts changes as an area of the substrate 501 increases or as the liquid crystal display panel changes, the robot arms may easily accommodate the changes.

Figure 9:
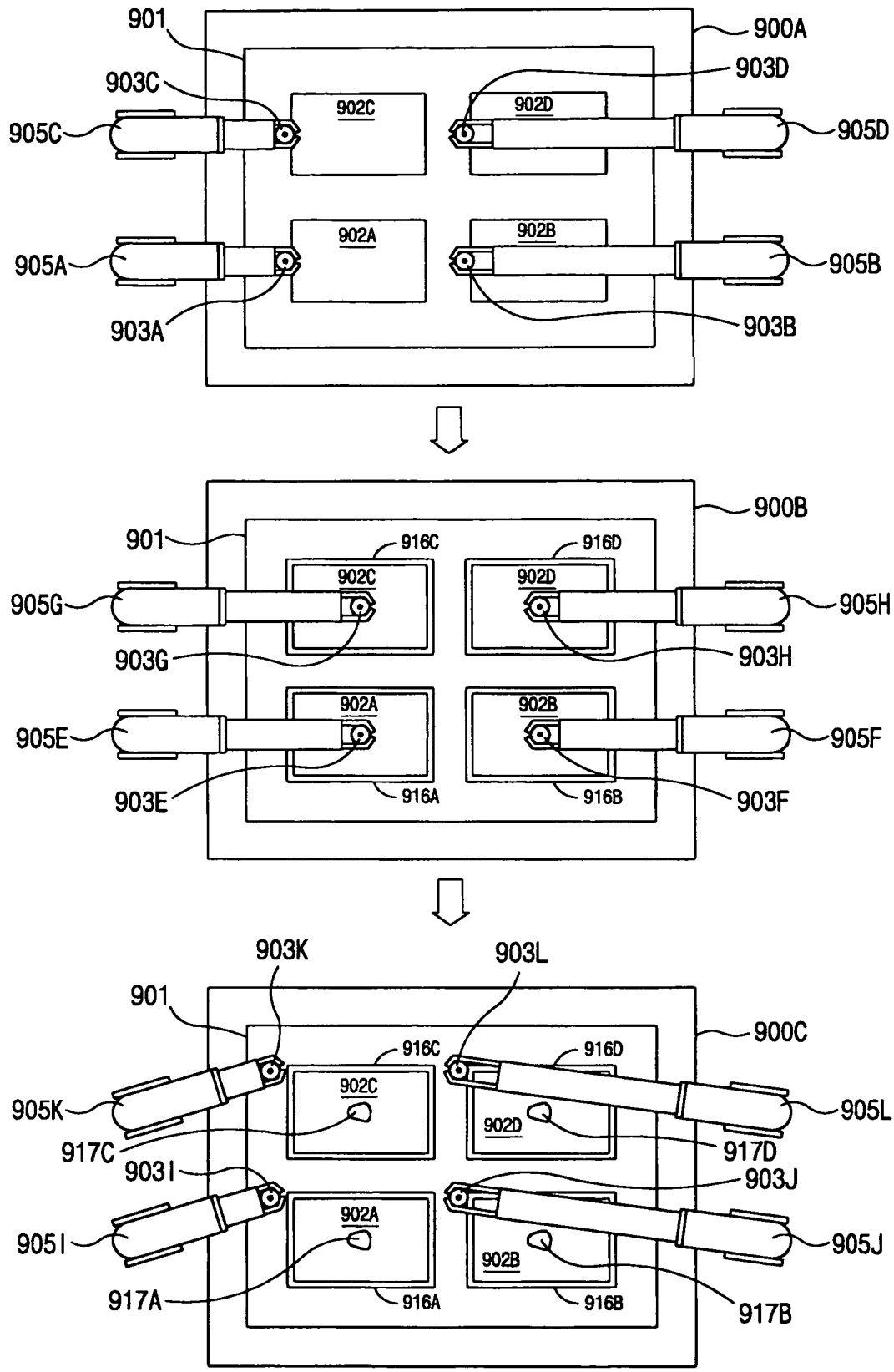
FIG. 9 is a plan view of an exemplary dispensing method using a dispenser system for a liquid crystal display panel according to the present invention.

FIG. 9 is a plan view of an exemplary dispensing method using a dispenser system for a liquid crystal display panel according to the present invention. In FIG. 9, first to third tables 900A~900C may be provided to be independently driven along a convey path of a substrate 901 having a plurality of image display parts 902A~902D formed thereon, and a plurality of robot arms 905A~905L may be provided at both sides of the first to third tables 900A~900C in pairs. In addition, a plurality of syringes 903A~903L each having a nozzle provided at each one end portion may be provided on the robot arms 905A~905L.

Although formation of the image display parts 902A~902D is shown in a 2-lines×2-columns matrix configuration, a plurality of image display parts 902A~902 having a matrix configuration of M-lines×N-columns may be formed on the substrate 901, according to which the number of robot arms 905A~905L and the number of syringes 903A~903L may differ accordingly.

The syringes 903A~903L may include one of a sealant material, a liquid crystal material, and a silver material. For example, a first plurality of syringes 903A~903D provided on a first plurality of robot arms 905A~905D corresponding to the first table 900A may include the sealant material, a second plurality of syringes 903E~903H provided on a second plurality of robot arms 905E~905H corresponding to the second table 900B may include the liquid crystal material, and a third plurality of syringes 903I~903L provided on a third plurality of robot arms 905I~905L corresponding to the third table 900C may include the silver material. Accordingly, productivity and efficiency of a liquid crystal display panel may be improved.

When the substrate 901 upon which the image display parts 902A~902D are formed is loaded onto the first table 900A, the seal patterns 916A~916D may be formed along outer edges of the image display parts 902A~902D using the first plurality of syringes 903A~903D provided on the first plurality of robot arms 905A~905D provided at both sides of the first table 900A in pairs. Accordingly, when the first plurality of syringes 903A~903D are driven to form the seal patterns 916A~916D, foreign material may be generated and adsorbed onto the image display parts 902A~902D of the substrate 901. Thus, the first table 900A may be moved along horizontal forward/backward and left/right directions to form the seal patterns 916A~916D.

When the substrate 901 upon which the seal patterns 916A~916D have been formed along the outer edges of the image display parts 902A~902D is loaded on the second table 900B, the liquid crystal material may be dropped onto the image display parts 902A~902D using the second plurality of syringes 903E~903H provided on a second plurality of robot arms 905E~905H provided at both sides of the second table 900B in pairs.

When the substrate 901 upon which the liquid crystal material 917A~917D have been dropped onto the image display parts 902A~902D is loaded on the third table 900C, silver dots may be formed along the outer edges of the image display parts 902A~902D using the third plurality of syringes 903I~903L provided on a third plurality of robot arms 905I~905L provided at both sides of the third table 900C in pairs. In addition, although not shown, at least one silver dot may be formed at each of the outer edges of the image display parts 902A~902D, and a plurality of silver dots may be formed according to signal characteristics.

It will be apparent to those skilled in the art that various modifications and variations can be made in the dispenser system for a liquid crystal display panel, a dispensing method using a dispenser system, and a method of fabricating a liquid crystal display panel using a dispenser system and a dispensing method of the present invention without departing from the spirit or scope of the inventions. Thus, it is intended that the present invention covers the modifications and variations of this invention provided they come within the scope of the appended claims and their equivalents.

What is claimed is:

1. A dispensing method for a liquid crystal display panel, comprising:

mounting first and second pluralities of syringes each having a nozzle at one end portion at first and second pluralities of robot arms arranged at opposing sides of first and second tables, respectively, at least two robot arms arranged at each opposing side of the first and second tables;

loading a substrate having a first plurality of image display parts and a second plurality of image display parts onto the first table, wherein the first plurality of image display parts have a first size and the second plurality of image display parts have a second size;

forming a plurality of first seal patterns along outer edges of the first image display parts by using the first plurality of syringes;

loading the substrate having the first plurality of seal patterns onto the second table;

forming a second plurality of seal patterns along outer edges of the second plurality of image display parts by using the second plurality of syringes, wherein the first plurality of image display parts each have a first size and the second plurality of image display parts each have a second size different from the first size; and independently driving the first and second tables along a convey path of the substrate, wherein driving the first and second tables includes moving the first and second tables along horizontal forward/backward and left/right directions to form the first and second plurality of seal patterns onto predetermined locations of the substrate without moving the first and second pluralities of robot arms.

* * * * *